US009085220B2

(12) United States Patent
Yoshihara et al.

(10) Patent No.: US 9,085,220 B2
(45) Date of Patent: Jul. 21, 2015

(54) DOOR SASH

(75) Inventors: Jiro Yoshihara, Fujisawa (JP); Kenji Shimizu, Fujisawa (JP)

(73) Assignee: SHIROKI CORPORATION, Fujisawa-Shi, Kanagawa (JP)

(*) Notice: Subject to any disclaimer, the term of this patent is extended or adjusted under 35 U.S.C. 154(b) by 0 days.

(21) Appl. No.: 14/232,207

(22) PCT Filed: Jul. 10, 2012

(86) PCT No.: PCT/JP2012/067551
§ 371 (c)(1),
(2), (4) Date: Jan. 10, 2014

(87) PCT Pub. No.: WO2013/008805
PCT Pub. Date: Jan. 17, 2013

(65) Prior Publication Data
US 2014/0159431 A1 Jun. 12, 2014

(30) Foreign Application Priority Data

Jul. 12, 2011 (JP) ................................ 2011-154255

(51) Int. Cl.
*B60J 5/04* (2006.01)
*B23K 11/06* (2006.01)
*B23P 15/00* (2006.01)

(52) U.S. Cl.
CPC ................. *B60J 5/04* (2013.01); *B23K 11/061* (2013.01); *B23P 15/00* (2013.01); *B60J 5/0402* (2013.01); *B23K 2201/006* (2013.01); *Y10T 29/49* (2015.01)

(58) Field of Classification Search
CPC .......... B60J 5/04; B60J 5/0401; B60J 5/0402; B60J 5/0406; B60J 5/0463

USPC ...................... 296/146.5, 146.6; 49/502, 506; 29/897.2
See application file for complete search history.

(56) References Cited

U.S. PATENT DOCUMENTS 4,457,111 A * 7/1984 Koike ............................. 49/441
5,735,081 A * 4/1998 Yamanaka et al. .............. 49/506
(Continued)

FOREIGN PATENT DOCUMENTS

JP          61-34958 A      2/1986
JP          08-104139 A     4/1996
(Continued)

OTHER PUBLICATIONS

English translation of PCT/ISA/237 (written opinion of the international searching authority, dated Aug. 7, 2012).
(Continued)

*Primary Examiner* — Gregory Blankenship
(74) *Attorney, Agent, or Firm* — McGinn IP Law Group, PLLC

(57) ABSTRACT

When a formed product having undergone roll forming and welding is bent in the shape of a door sash, the formed product may distort and/or deform. Such distortion and/or deformation is reduced to a sufficient degree. A door sash is formed by bending an elongated metal plate in a widthwise direction such that portions thereof are superimposed, which are welded together for unification. The door sash has a joint portion extending in a longitudinal direction and having exposed surfaces extending continuously in the widthwise direction, a pocket portion extending continuously from one widthwise end of the joint portion and being to be located on the inner side of a vehicle, and a design portion extending continuously from the other widthwise end of the joint portion and being to be located on the outer side of the vehicle. The door sash is bent in the longitudinal direction, and has two parallel welding marks formed on each of the exposed surfaces of the joint portion and extending in the longitudinal direction.

13 Claims, 4 Drawing Sheets

(56) References Cited

U.S. PATENT DOCUMENTS

| | | | |
|---|---|---|---|
| 5,983,571 A * | 11/1999 | Takeda et al. | 49/502 |
| 5,992,021 A * | 11/1999 | Takeda et al. | 29/897.2 |
| 6,016,630 A * | 1/2000 | Takeda et al. | 49/502 |
| 6,112,470 A * | 9/2000 | Hashimoto et al. | 49/502 |
| 6,840,565 B2 * | 1/2005 | Masunaga et al. | 296/146.5 |
| 7,762,021 B2 * | 7/2010 | Fujiwara et al. | 49/502 |
| 7,900,993 B2 * | 3/2011 | Suzuki et al. | 296/146.5 |
| 2009/0115220 A1 * | 5/2009 | Takeuchi et al. | 296/146.6 |
| 2009/0195013 A1 * | 8/2009 | Suzuki et al. | 296/146.5 |
| 2012/0192498 A1 * | 8/2012 | Fukui et al. | 49/504 |
| 2014/0042772 A1 * | 2/2014 | Ohsawa et al. | 296/146.5 |
| 2014/0132028 A1 * | 5/2014 | Yamada et al. | 296/146.2 |
| 2014/0157602 A1 * | 6/2014 | Fukui et al. | 29/897.2 |
| 2014/0246878 A1 * | 9/2014 | Shimizu et al. | 296/146.2 |

FOREIGN PATENT DOCUMENTS

| | | | | |
|---|---|---|---|---|
| JP | 11-347669 A | | 12/1999 | |
| JP | 2003-200852 A | | 7/2003 | |
| JP | 2010-12891 | * | 1/2010 | B60J 5/04 |
| JP | 2013-18409 | * | 1/2013 | B60J 5/04 |
| JP | 2013-199275 | * | 10/2013 | B60J 5/04 |

OTHER PUBLICATIONS

PCT/IB/373 dated Jan. 14, 2014.

PCT/IB/338 dated Jan. 23, 2014.

International Search Report of PCT/JP2012/067551 dated Aug. 7, 2012.

* cited by examiner

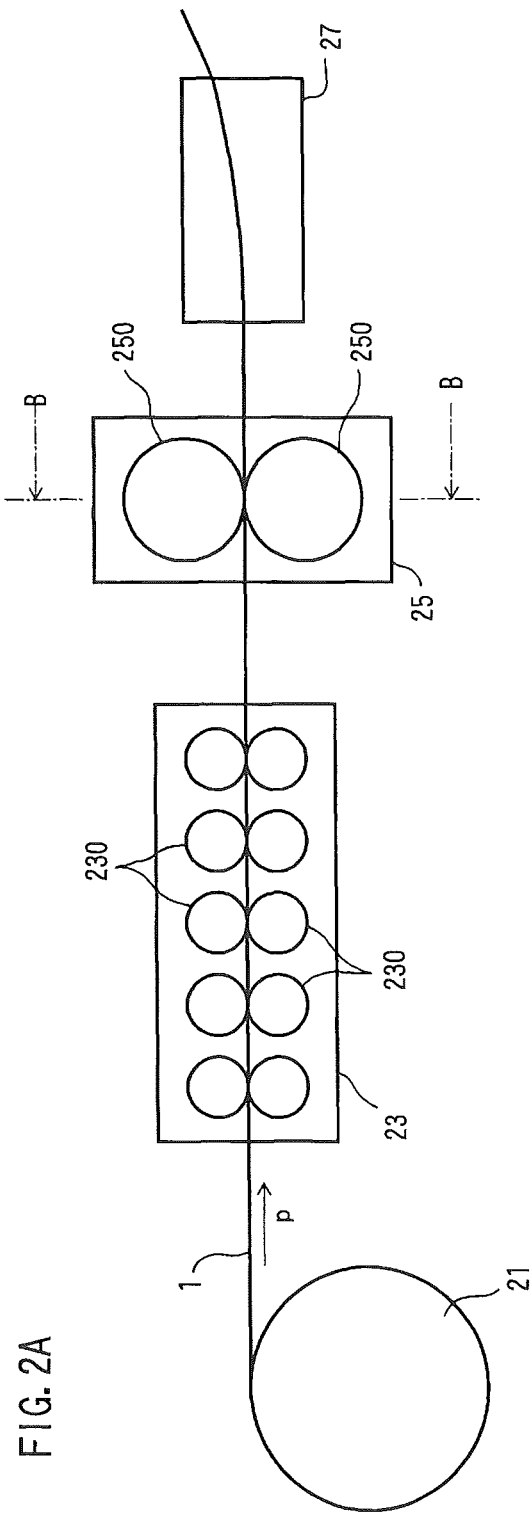
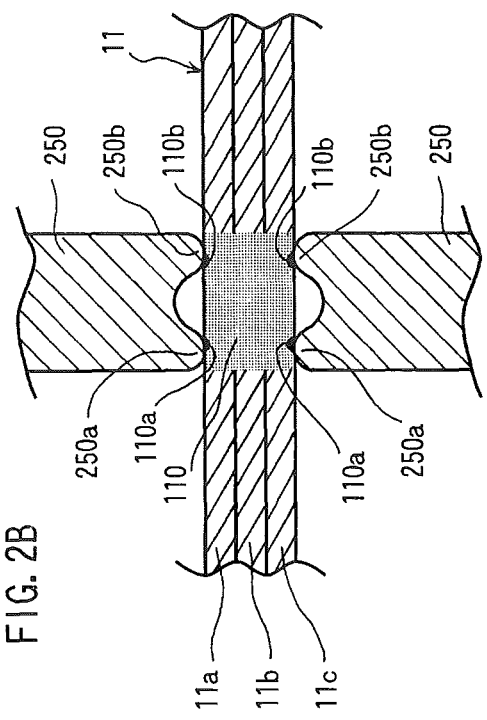

DOOR SASH

TECHNICAL FIELD

The present invention relates to a door sash which is formed by superimposing flat portions of an elongated metal plate by roll forming or the like such that the flat portions are aligned in the widthwise direction, welding the superimposed portions together, and bending the metal plate in a longitudinal direction.

BACKGROUND ART

A formed product which is formed by superimposing flat portions of an elongated metal plate by roll forming such that the flat portions are aligned in the widthwise direction, and uniting the superimposed portions together by welding is disclosed, for example, in Japanese Patent Application Laid-Open (kokai) No H8-104139 (Patent Document 1). In this formed product, the portions superimposed through roll forming are welded together along a line by seam welding or laser welding.

PRIOR ART DOCUMENT

Patent Document

Patent Document 1: Japanese Patent Application Laid-Open (kokai) No. H8-104139

SUMMARY OF THE INVENTION

Problem to be Solved by the Invention

In Patent Document 1, the formed product having undergone welding is bent in the longitudinal direction into the shape of a door sash. However, this prior art has a problem in that distortion, deformation, or the like easily occurs during the bending work. Namely, in the bending work, as shown in FIG. 3B, a half-finished product having undergone roll forming is bent by pressing the flat surfaces of a joint portion 11 against bending dies 271 while applying a tension to the joint portion 11 in the longitudinal direction thereof. However, of the joint portion 11 composed of three metal plates superimposed on one another, only a fusion portion (a fusion portion extending straight in the longitudinal direction) 110 located at an approximately central position in the widthwise direction is a welded portion, and welding is not performed for portions of the joint portion 11 located on opposite sides of the fusion portion 110. Meanwhile, the bending direction, which determines a portion on which stress acting on the joint portion 11 concentrates, changes with the position in the longitudinal direction. Therefore, the portion where stress concentration occurs changes with the position in the longitudinal direction. For example, in a certain position in the longitudinal direction, stresses concentrate on the right side of the fusion portion 110 (the side toward a pocket portion 15), and in another position, stresses concentrate on the left side of the fusion portion 110 (the side toward a design portion 12). Since the position of stress concentration in the widthwise direction changes with the position in the longitudinal direction as described above, distortion, deformation, or the like easily occurs.

The present invention has been accomplished in view of the above-described problem, and its object is to sufficiently reduce distortion and/or deformation of a formed product having undergone roll forming and welding, the distortion and/or deformation occurring when the formed product is bent in the shape of a door sash.

Means for Solving the Problems

The present invention is configured as mentioned below in [1] to [3]. Reference numerals appearing in the present section (MEANS FOR SOLVING THE PROBLEMS) and the next section (EFFECTS OF THE INVENTION) are provided for easy understanding and should not be construed as limiting the invention to the configuration described with the reference numerals.

[1] Configuration 1

A door sash 10 which is formed of an elongated metal plate 1 and which includes a joint portion 11, a pocket portion 15, and a design portion 12, the joint portion 11 having exposed surfaces which extend continuously in a widthwise direction and extending in a longitudinal direction, the pocket portion 15 extending continuously from one widthwise end of the joint portion 11 and being to be located on an inner side of a vehicle, and the design portion 12 extending continuously from the other widthwise end of the joint portion 11 and being to be located on an outer side of the vehicle, the door sash 10 being characterized in that the joint portion 11 is formed as a superimposed portion of the metal plate, and has two welding marks 110a, 110b formed on each of the exposed surfaces and extending in the longitudinal direction.

A method of manufacturing a door sash characterized by comprising:

a forming step of roll-forming an elongated metal plate into a shape which has a superimposed portion extending in a longitudinal direction and having exposed surfaces extending continuously in a widthwise direction, a pocket portion extending from one widthwise end of the superimposed portion, and a design portion extending from the other widthwise end of the superimposed portion; and a welding step of seam-welding the superimposed portion to form a joint portion having exposed surfaces each of which has two welding marks extending in the longitudinal direction.

The "widthwise direction" corresponds to an inboard-outboard direction of an automobile to which the door sash is attached.

[2] Configuration 2

The door sash 10 according to Configuration 1 is characterized by further including a fusion portion 110 extending continuously between the two welding marks 110a, 110b.

This continuous fusion portion 110 is formed as a result of flows of current between electrode peripheral edge protrusions of upper and lower seam welding electrodes, which protrusions are present at respective edge positions located opposite each other. Namely, in FIG. 2B, the fusion portion 110 is formed as a result of a flow of current between the electrode peripheral edge protrusion 250a of the upper seam welding electrode and the electrode peripheral edge protrusion 250b of the lower seam welding electrode, and a flow of current between the electrode peripheral edge protrusion 250b of the upper seam welding electrode and the electrode peripheral edge protrusion 250a of the lower seam welding electrode. Such flows of current are produced because the peripheral edge protrusions are formed along the opposite edges of the circumferential surface of the same electrode.

[3] Configuration 3

The door sash 10 according to Configuration 1 or 2 is characterized in that the two welding marks 110a, 110b are formed by a pair of electrode peripheral edge protrusions 250a, 250b provided along opposite edges of a circumferential surface of a cylindrical seam welding electrode 250.

Effects of the Invention

Configuration 1 is a door sash 10 which is formed of an elongated metal plate 1 and which includes a joint portion 11, a pocket portion 15, and a design portion 12, the joint portion 11 having exposed surfaces which extend continuously in a widthwise direction and extending in a longitudinal direction, the pocket portion 15 extending continuously from one widthwise end of the joint portion 11 and being to be located on an inner side of a vehicle, and the design portion 12 extending continuously from the other widthwise end of the joint portion 11 and being to be located on an outer side of the vehicle, the door sash 10 being characterized in that the joint portion 11 is formed as a superimposed portion of the metal plate, and has two welding marks 110a, 110b formed on each of the exposed surfaces and extending in the longitudinal direction. Therefore, in the joint portion 11 having exposed surfaces extending continuously in the widthwise direction, at least portions which are slightly offset from a widthwise center toward opposite widthwise ends are welded along straight lines. Therefore, during bending work, the concentration of stress on a portion which changes in accordance with the position in the longitudinal direction is mitigated. As a result, a door sash 10 which has reduced amounts of distortion and deformation can be obtained. Also, since distortion and deformation are reduced to a sufficient degree, an uneven shape caused by distortion and/or deformation does not appear on the surface of the design portion, whereby the door sash 10 can have a good design. Also, since the stress is relaxed, even when the thickness of the elongated metal plate is reduced, a sufficiently large torsional rigidity can be obtained, whereby the weight of the door sash 10 can be decreased. Further, since welding is performed continuously without formation of gaps in the longitudinal direction, in use, water having entered from an end potion of the door sash 10 in the longitudinal direction does not ooze out through a gap, whereby rusting can be prevented.

Configuration 2 is the door sash 10 according to Configuration 1 characterized by further including a fusion portion 110 extending continuously between the two welding marks 110a, 110b. Since a band-shaped welded portion is formed between the portions which are slightly offset from the widthwise center toward the opposite widthwise ends, the door sash 10 is less likely to deform as compared with the case where the door sash 10 employs Configuration 1, whereby the effect of Configuration 1 can be enhanced further.

Configuration 3 is the door sash 10 according to Configuration 1 or 2 characterized in that the two welding marks 110a, 110b are formed by a pair of electrode peripheral edge protrusions 250a, 250b provided along opposite edges of a circumferential surface of a cylindrical seam welding electrode 250. Therefore, in addition to the effects of Configurations 1 and 2, there can be achieved the effect of providing the specific shape of the seam welding electrode which forms the two welding marks 110a, 110b.

BRIEF DESCRIPTION OF THE DRAWINGS

FIGS. 1A and 1B show a door sash according to a first embodiment, wherein FIG. 1A is a perspective view of a main portion of the door sash, and FIG. 1B is a transverse sectional view of the door sash.

FIGS. 2A and 2B show a method of manufacturing the door sash of the first embodiment, wherein FIG. 2A is a schematic diagram showing a production system, and FIG. 2B is a schematic sectional view showing seam welding.

FIGS. 4A and 4B show transverse sections of door sashes according to embodiments different from FIGS. 1A and 1B, wherein FIG. 4A shows the door sash according to a second embodiment which is composed of two metal plates, and FIG. 4B shows the door sash according to a third embodiment which is composed of three metal plates.

MODES FOR CARRYING OUT THE INVENTION

Embodiments of the present invention will be described with reference to the drawings.

Figure 3A:
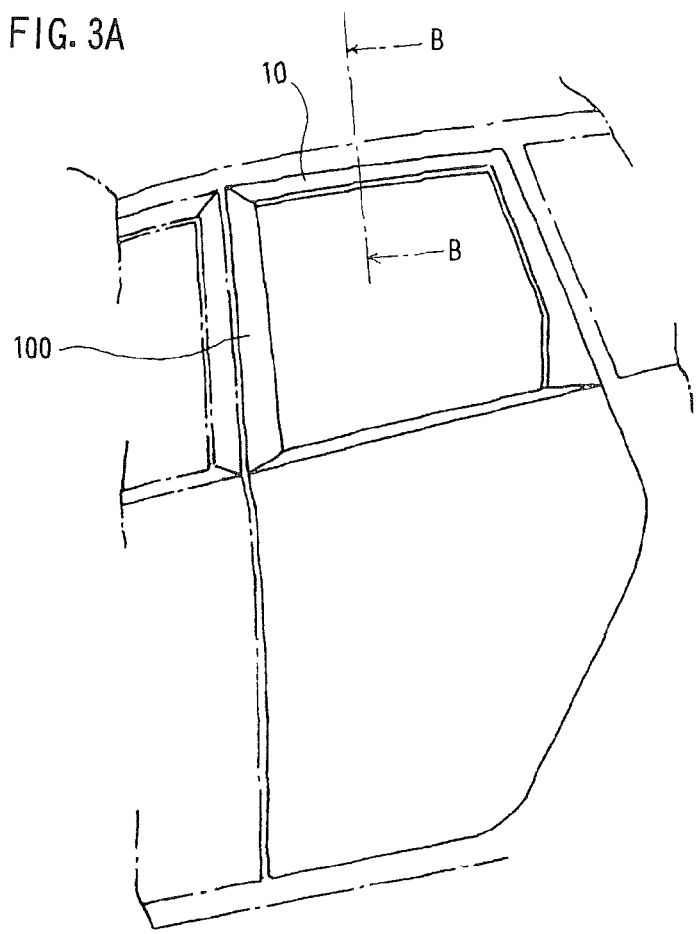
FIG. 3A is an explanatory view showing positions where a door sash is mounted.

As shown in FIG. 3A, an example of a door sash includes an upper sash 10 and a center pillar sash 100. Although FIG. 3A shows a rear door of a sedan, the present invention may be applied to a door sash (e.g., an upper sash) of other doors such as a front door.

(1) First Embodiment

The upper sash 10 will be described.

Figure 1A:
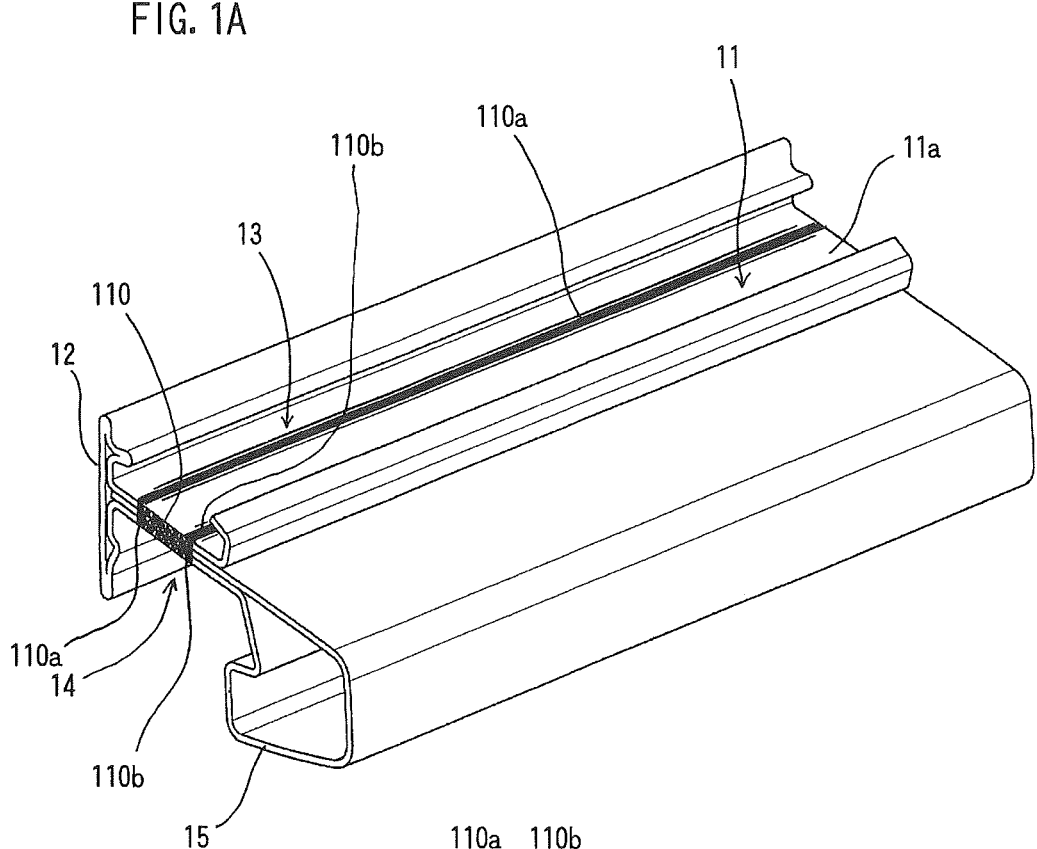
Figure 1B:
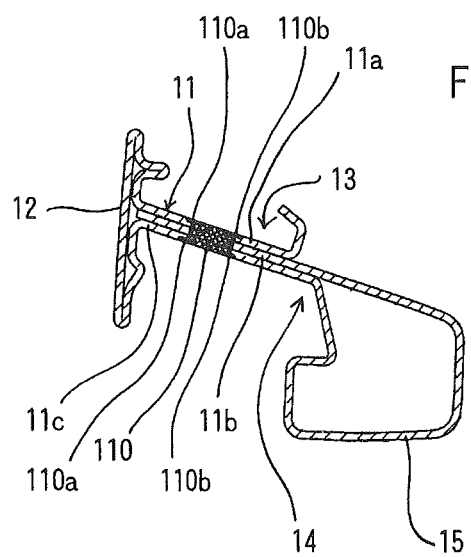

As shown in FIGS. 1A and 1B, the upper sash 10 has a pocket portion 15, a design portion 12, and a joint portion 11 which connects these portions. In a state in which the upper sash 10 is mounted to a door of a vehicle, the pocket portion 15 is located on the inner side of the vehicle, and the design portion 12 is located on the outer side of the vehicle. A groove-like recess formed on the upper side of the joint portion 11 functions as a weather strip seat 13 which fixedly holds a weather strip WS (see FIG. 4A), and a groove-like recess formed on the lower side of the joint portion 11 functions as a glass run seat 14 which fixedly holds a glass run GR (see FIG. 4A).

The shape shown in FIGS. 1A and 1B (the shape having the pocket portion 15, the design portion 12, and the joint portion 11) is formed by passing a strip-shaped (elongated) metal plate 1, which is fed from a material supply apparatus (uncoiler) 21, between a plurality of rollers 230 of a roll forming machine 23 as shown in FIG. 2A. Since roll forming is publicly known, the roll forming will not be described further.

The joint portion 11 formed by superimposing three metal plate portions (an upper plate portion 11a, a middle plate portion 11b, and a lower plate portion 11c) through roll forming has two welding marks 110a 110b formed on each of exposed surfaces of the joint portion 11 (an upper surface of the upper plate portion 11a and a lower surface of the lower plate portion 11c, each of which forms an exposed surface extending continuously without ending in the widthwise direction). A fusion portion 110 is formed in a region immediately below an area between the two welding marks 110a and 110b. Namely, the fusion portion 110 is generally formed in the shape of a parallelepiped (band) surrounded by the four welding marks 110a, 110b, 110b, and 11a in total. The upper plate portion 11a, the middle plate portion 11b, and the lower plate portion 11c, which constitute the joint portion 11, are united by the fusion portion 110.

The welding marks 110a and 110b and the fusion portion 110 are formed by guiding a formed product having undergone roll forming into a seam welder 25 located downstream of the roll forming machine 23, and performing seam welding on the formed product while passing the formed product between seam welding electrodes (roller electrodes) 250.

Each seam welding electrode 250 generally has the shape of a short cylinder (circular plate/disc), and its circumferential surface projects at opposite edges thereof as shown in FIG. 2B. Namely, electrode peripheral edge protrusions 250a and 250b are provided along the opposite edges of the cylindrical circumferential surface. The electrode peripheral edge protrusions 250a and 250b of the upper and lower seam welding electrodes 250 are pressed against the upper surface of the upper plate portion 11a and the lower surface of the lower plate portion 11c, respectively, whereby pressure is applied to the joint portion 11 from the upper and lower sides thereof. In this state, electrical power is supplied between the upper and lower seam welding electrodes 250 so as to perform seam welding, to thereby form the welding marks 110a and 110b, and the band-shaped fusion portion 110 which extends continuously in the widthwise direction as well. This continuous fusion portion 110 is formed as a result of flows of current between the electrode peripheral edge protrusions of the upper and lower seam welding electrodes, which protrusions are present at respective edge positions located opposite each other. Namely, the fusion portion 110 is formed as a result of a flow of current between the electrode peripheral edge protrusion 250a of the upper seam welding electrode and the electrode peripheral edge protrusion 250b of the lower seam welding electrode, and a flow of current between the electrode peripheral edge protrusion 250b of the upper seam welding electrode and the electrode peripheral edge protrusion 250a of the lower seam welding electrode. Such flows of current are produced because the peripheral edge protrusions are formed along the opposite edges of the circumferential surface of the same electrode.

Figure 3B:
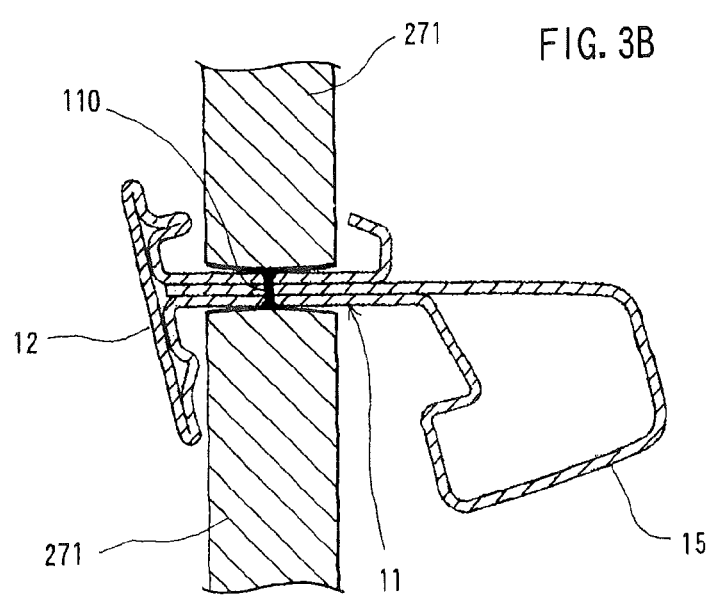
FIG. 3B is a schematic sectional view taken along line B-B of FIG. 3A and exemplifying a bending work after conventional seam welding.

In the example shown in FIG. 2A, the formed product having undergone seam welding is guided to a bending apparatus 27 disposed downstream of the seam welder 25. In the bending apparatus 27, in a state in which a tension is applied to the formed product in the longitudinal direction, the formed product is pressed against a plurality of bending dies 271 (see FIG. 3B), to thereby be bent.

In place of the bending apparatus 27 shown in FIG. 2A, a known bending apparatus may be used so as to bend the formed product. Namely, the formed product having undergone seam welding is cut, and is then bent by the known bending apparatus. Either method may be employed.

In this manner, the formed product having undergone seam welding is bent in a three-dimensional direction determined in accordance with the position in the longitudinal direction, whereby the formed product is formed into the shape of a door sash.

During the above-described bending work (bending work shown in FIG. 2A or bending work by a known bending machine), the band-shaped fusion portion 110 mitigates the concentration of stress on a portion which changes in accordance with the position in the longitudinal direction. As a result, distortion and/or deformation during the bending work is reduced to a sufficient degree, whereby an uneven shape caused by distortion and/or deformation is prevented from appearing on the surface of the design portion 12, whereby a door sash 10 having a good external appearance can be obtained. Also, since the band-shaped fusion portion 110 has a sufficiently large torsional rigidity, a sufficiently high strength can be obtained even when the thickness of the elongated metal plate (raw material) is decreased. Namely, the weight of the door sash 10 can be lowered. Further, welding is performed continuously in the longitudinal direction without formation of gaps. Therefore, in use after the door sash 10 is attached to a door, water having entered from an end potion of the door sash 10 in the longitudinal direction does not ooze out through a welding gap, whereby rusting can be prevented.

[2] Second Embodiment

In the above, an example in which the door sash 10 is composed of a single elongated metal plate has been described. However, in the case of a vertical sash such as the center pillar sash 100 (see FIG. 3A), the door sash may be composed of two or more metal plates.

Figure 4A:
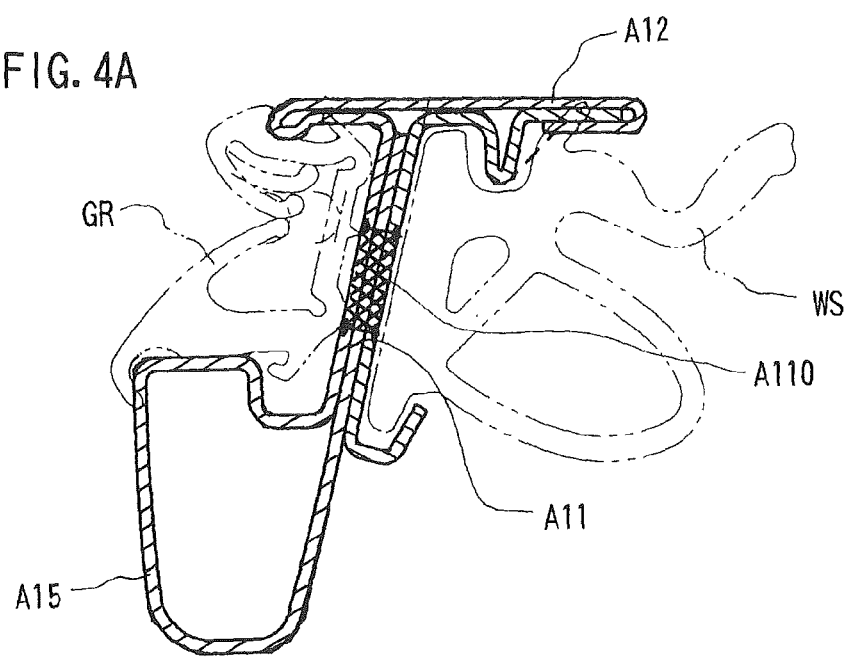

FIG. 4A shows an example in which the door sash is composed of two metal plates. The illustrated door sash has a pocket portion A15, a design portion A12, and a joint portion A11 which connects these portions. As in the case of the above-described first embodiment, the joint portion A11 is similarly welded through use of the seam welding electrodes 250. Also, two straight welding marks are similarly formed on each of the front and back exposed surfaces, and a fusion portion A110 is formed just under these welding marks.

Figure 4B:
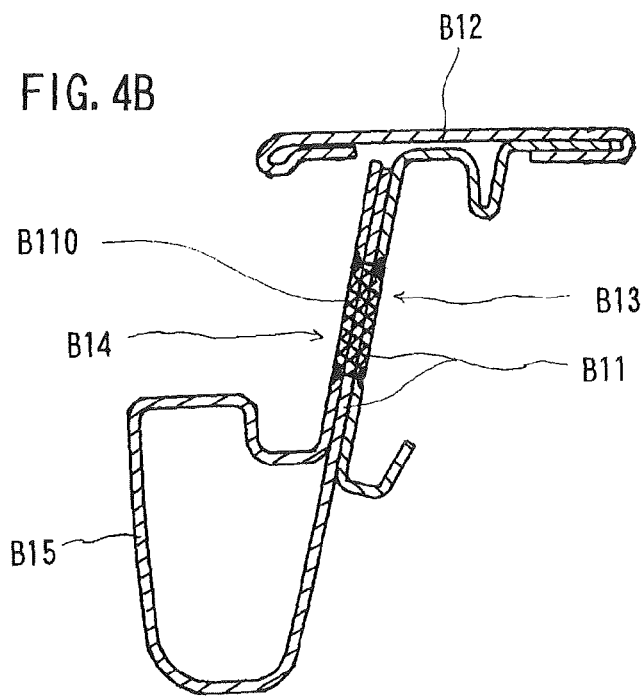

FIG. 4B shows an example in which the door sash is composed of three metal plates. The illustrated door sash has a pocket portion B15, a design portion B12, and a joint portion B11 which connects these portions. As in the case of the above-described first embodiment, the joint portion B11 is similarly welded through use of the seam welding electrodes 250. Also, two straight welding marks are similarly formed on each of the front and back exposed surfaces, and a fusion portion B110 is formed just under these welding marks.

In each of the door sashes shown in FIGS. 4A and 4B, distortion and/or deformation during the operation of bending the formed product in the longitudinal direction is reduced to a sufficient degree as in the case of the above-described first embodiment. Therefore, an uneven shape caused by distortion and/or deformation is prevented from appearing on the surface of the design portion 12, and the door sash has a good external appearance. Also, since the band-shaped fusion portion A110, B110 has a sufficiently large torsional rigidity, a sufficiently high strength can be obtained even when the thickness of each of the two or three metal plates (raw materials) is decreased. Namely, the weight of the door sash can be lowered. Further, welding is performed continuously in the longitudinal direction without formation of gaps. Therefore, in use after the door sash is attached to a door, water having entered from an end potion of the door sash in the longitudinal direction does not ooze out through a welding gap, whereby rusting can be prevented.

DESCRIPTION OF SYMBOLS

1: elongated metal plate (material used for roll forming)
10: door sash (upper sash)
100: door sash (center pillar sash)
11: joint portion
11a: upper plate portion (vehicle-body-side abutment portion)
11b: middle plate portion
11c: lower plate portion (glass-side abutment portion)
110: fusion portion
110a, 110b: welding mark
12: design portion
13: weather strip seat
14: glass run seat
15: pocket portion
21: uncoiler (material supply apparatus)
23: roll forming machine
230: roller 25: seam welder
250: seam welding electrode
250a, 250b: electrode peripheral edge protrusion
27: bending apparatus
271: bending die
A11: joint portion
A110: fusion portion
A12: design portion
WS: weather strip
GR: glass run
A15: pocket portion
B11: joint portion
B110: fusion portion
B12: design portion
B13: weather strip seat
B14: glass run seat
B15: pocket portion

The invention claimed is:

1. A method of manufacturing a door sash, the method comprising:
   roll-forming of an elongated metal plate into a shape which includes a superimposed portion extending in a longitudinal direction and including exposed surfaces extending continuously in a widthwise direction, a pocket portion extending from one widthwise end of the superimposed portion, and a design portion extending from another widthwise end of the superimposed portion; and
   performing seam welding on the superimposed portion while passing the superimposed portion between roller electrodes each of which includes edge protrusions formed along opposite edges of a circumferential surface of said each of the roller electrodes to form two welding marks on each of the exposed surfaces of the superimposed portion extending continuously in the longitudinal direction respectively and a fusion portion surrounded by the four welding marks in total so as to unite plates which are constituents of the superimposed portion.

2. The method of manufacturing the door sash according to claim 1, wherein the two welding marks formed on said each of the exposed surfaces of the superimposed portion are located at positions offset from a widthwise center toward opposite widthwise ends.

3. The method of manufacturing the door sash according to claim 1, wherein the fusion portion is formed between the four welding marks.

4. The method of manufacturing the door sash according to claim 1, wherein the fusion portion is formed between the four welding marks and extends continuously in the longitudinal direction.

5. The method of manufacturing the door sash according to claim 1, wherein the fusion portion extends from the two welding marks on one of the exposed surfaces of the superimposed portion to the two welding marks on another one of the exposed surfaces of the superimposed portion.

6. The method of manufacturing the door sash according to claim 1, wherein the seam welding comprises flowing a current between said each of the edge protrusions of the roller electrodes.

7. The method of manufacturing the door sash according to claim 1, wherein the seam welding comprises forming a joint portion as the superimposed portion of the metal plate.

8. The method of manufacturing the door sash according to claim 1, wherein, in a joint portion including exposed surfaces extending continuously in the widthwise direction, at least portions which are offset from a widthwise center toward opposite widthwise ends are welded along straight lines.

9. The method of manufacturing the door sash according to claim 8, wherein a band-shaped welded portion is formed between the portions which are offset from the widthwise center toward the opposite widthwise ends.

10. The method of manufacturing the door sash according to claim 1, wherein, in the seam welding, the fusion portion is formed in a region immediately below an area between the two welding marks on one of the exposed surfaces of the superimposed portion.

11. The method of manufacturing the door sash according to claim 1, wherein the fusion portion is formed in a shape of a parallelepiped surrounded by the four welding marks.

12. The method of manufacturing the door sash according to claim 1, wherein the rolling electrodes comprise a lower seam welding electrode and an upper seam welding electrode, and
   wherein, in the seam welding, the edge protrusions of the upper and lower seam welding electrodes are pressed against an upper surface of the metal plate and a lower surface of the metal plate portion, respectively, and a pressure is applied to the joint portion.

13. The method of manufacturing the door sash according to claim 12, wherein an electrical power is supplied between the upper seam welding electrode and the lower seam welding electrode to perform the seam welding.

* * * * *